Nov. 6, 1934.
A. R. BETHEL
1,979,661
GLASS MOLDING APPARATUS
Filed April 18, 1929    2 Sheets-Sheet 1
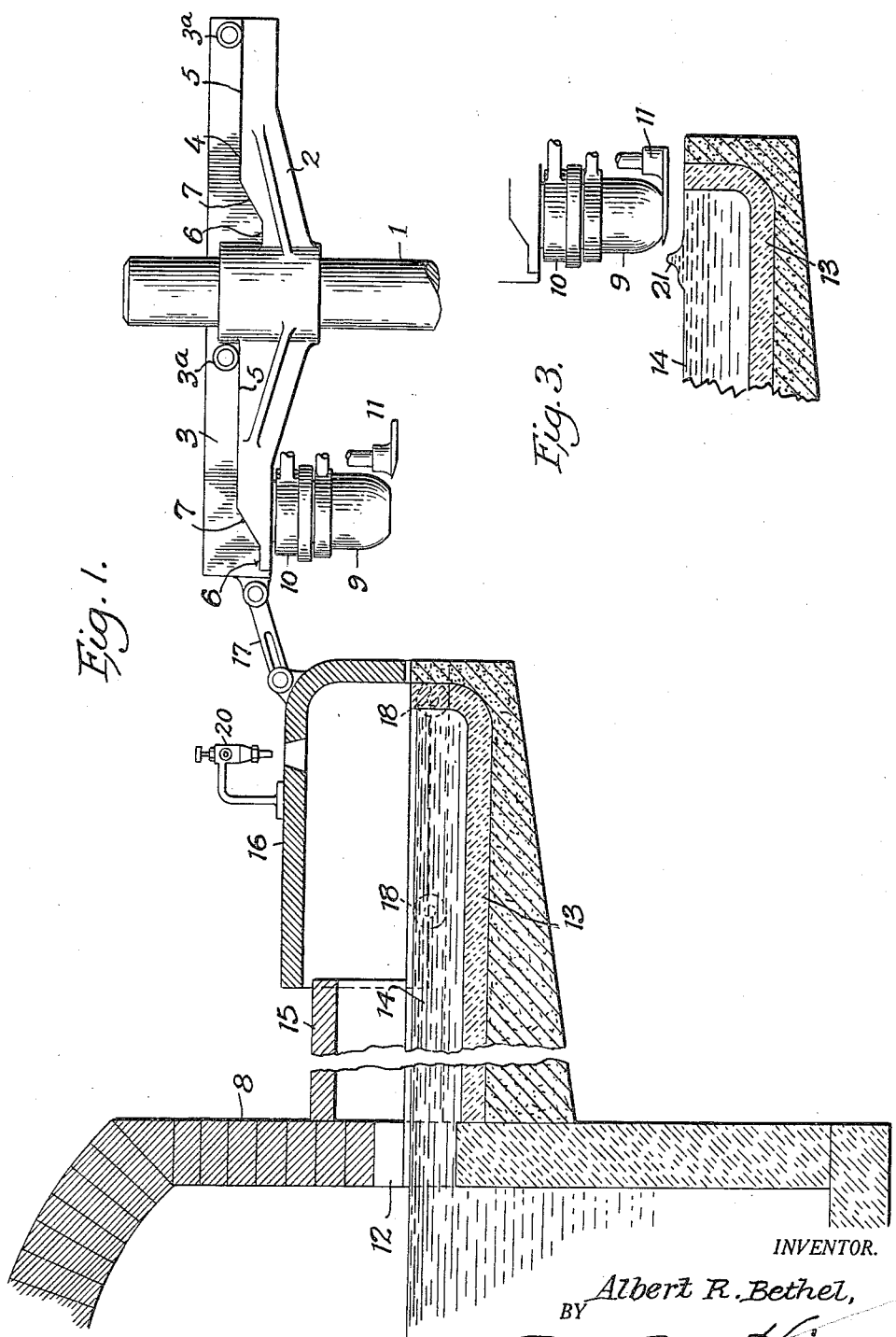
INVENTOR.
Albert R. Bethel,
BY
C. C. Hines,
ATTORNEY.

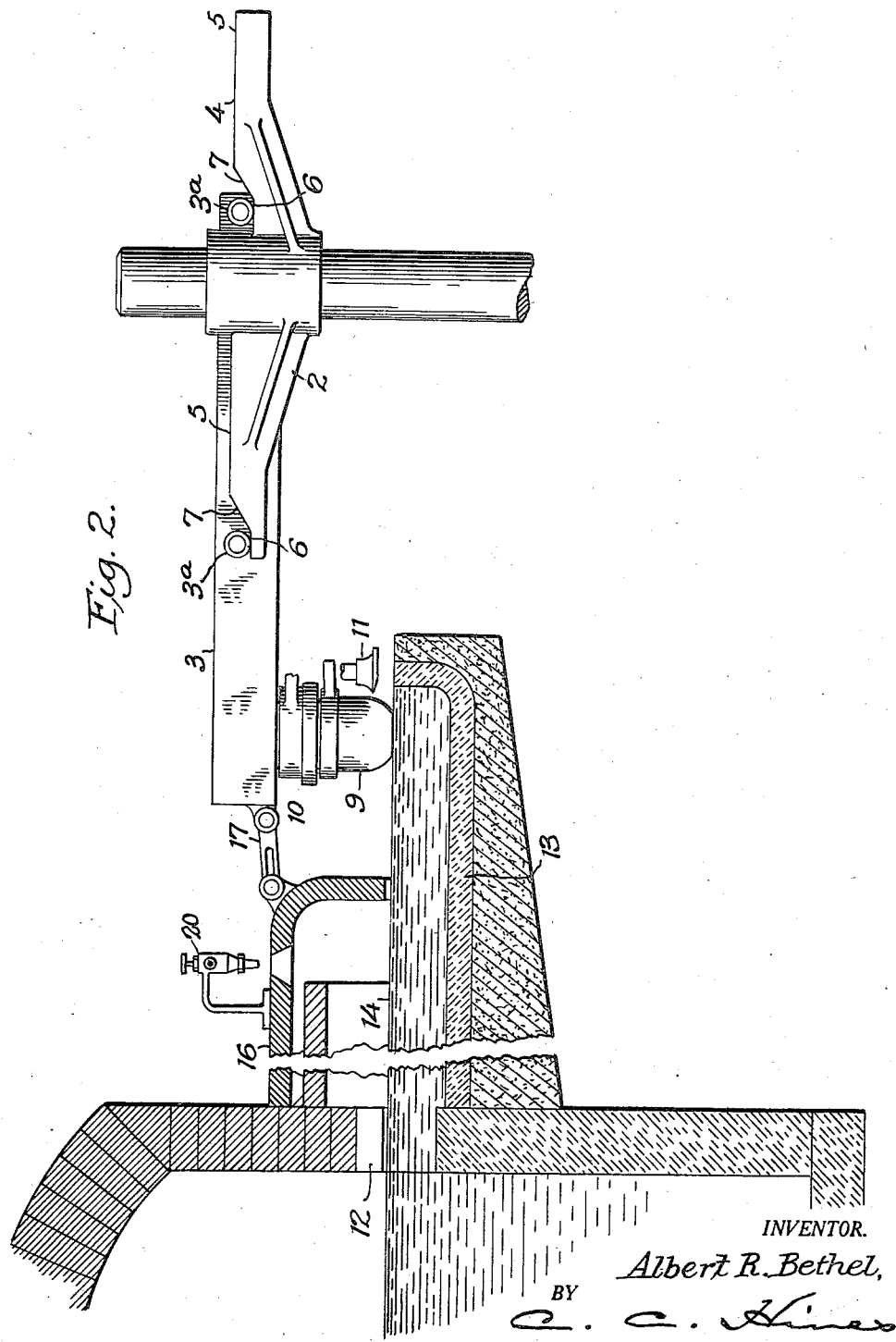

Patented Nov. 6, 1934

1,979,661

UNITED STATES PATENT OFFICE 1,979,661

GLASS MOLDING APPARATUS

Albert R. Bethel, Huntington Park, Calif., assignor to Hartford-Empire Company, Hartford, Conn., a corporation of Delaware Application April 18, 1929, Serial No. 356,151

10 Claims. (Cl. 49—5)

This invention relates to improvements in bottle making machines of that general type in which a blank mold is moved into position to receive a charge of glass from a receptacle containing molten glass and is charged through an opening in its lower end by suction, the glass in the blank mold then severed from the neck or string of glass connecting it with the glass in the receptacle, the blank mold moved away from the receptacle and the blank blown in the mold, the severing knife or other means employed to close the bottom opening in the blank mold withdrawn and the body of said blank mold opened, leaving the blank supported by the neck mold portion of the blank mold, the blank enclosed by a finishing mold and blown to a finished condition therein, and the molds opened to discharge the article therefrom.

Where, as in the practical operation of some machines of this character, the suction mold dips directly into the glass supply bath to take up a charge therefrom, a difficulty is encountered, in that a cold spot at the point of contact of the mold with the glass is left, together with a cold teat of glass formed by the residual portion of the severed neck, which cold portions of glass are taken up by a blank mold in the next charging action, resulting in the production of a faulty or imperfect article. This mode of charging and the subsequent act of blank blowing are also comparatively slow in machines in which the molds are carried by a rotary traveling frame or reciprocated and lowered and raised for the dipping action by different sets of devices on account of the time period of travel of a blank mold from blank blowing to charging position and vice versa and for the time periods of operation of such sets of devices.

One object of my invention is to provide means for reciprocating the blank mold from blowing position on a support toward and from the source of glass supply while simultaneously moving it up and down on and by means of said support for dipping its charging end into and withdrawing it from the glass, whereby the working structure is greatly simplified and its cost of construction materially reduced, and whereby the time period required for the gathering action is materially reduced; and another object of my invention is to provide means for closing the glass receptacle at all times except when the mold is taking a charge and for heating the cooled portions of glass between charging actions, so that glass charges of substantially uniform temperature and consistency will at all times be furnished and the formation of faulty or imperfect articles prevented or reduced to the minimum.

The invention consists of the features of construction, combination and arrangement of parts, hereinafter fully described and claimed, reference being had to the accompanying drawings, in which:—

Figure 1 is a vertical section through a portion of a furnace and a discharge receptacle communicating therewith and a view in elevation of a suction blank mold and coacting parts, showing the mold in position for blowing the blank and for cooperation with a finished mold.

Figure 2 is a similar view showing the blank mold in gathering position.

Figure 3 is a view showing the cut off device as it appears just subsequent to the severance of the neck of glass between the charge and the bath.

In the drawings I have shown only the elements of my invention as employed in connection with a sectional suction blank mold and neck-mold and a cut-off of known type and have omitted any showing of the finishing mold and the details of construction of the blank and neck molds, the suction producing means, and the means for operating these parts, as such molds and cut-off and the means for operating them, as well as the suction producing means, may be of a kind well known in the art and are not necessary to an understanding of my invention. I have also omitted any showing of means for reciprocating the blank and neck-mold supporting carriage, as any suitable means, such as a known type of air cylinder and piston mechanism, may be employed for the purpose.

Referring now more particularly to the drawings, 1 designates a stationary supporting upright on which is rigidly mounted a horizontal transverse supporting arm 2 having a guide channel in its upper face receiving a reciprocatory carriage 3. The arm 2 is provided with a cam trackway comprising track rails 4 (one of which is shown) at opposite sides of and forming the channel, each track rail having upper horizontal track surfaces 5 and relatively depressed or lower track surfaces 6 connected by inclined portion 7, said rails and their stated portions being rigid with one another or of unitary construction. The carriage is provided with rollers 3ª to travel upon the track rails and one end of the carriage is arranged in suitably spaced relation to a melting furnace 8, and on this end of the carriage is mounted a sectional blank mold 9 and coacting neck-mold 10 and a cut-off device 11. It should be noted that the rollers are in such spaced relation to each other longitudinally of the carriage 3 that they rest upon portions of the track rails at opposite sides of the post. Therefore when the carriage is reciprocated toward and away from the receptacle containing the molten glass the rollers will not only serve to slidably mount the carriage but also serve to limit its reciprocating movement by contact with the mounting sleeve of the track which fits about the post 1, as shown in Figs. 1 and 2. The blank mold is one of that type having a normally open lower end to dip into the glass bath and to take up a blank forming charge therefrom by suction and to be moved into a position (that shown in Fig. 1) in which the blank is blown by suitable mechanism and the blank mold then opened, leaving the blank supported by the neck mold so as to be surrounded by a finishing mold which is moved upward to enclose it, after which the blank is blown by suitable mechanism to form the completed article and the molds opened to discharge the same. The cut-off device may comprise a cutting knife carried by a shaft mounted on the carriage and movable by suitable mechanism through an arc from an inactive to a cut-off position, in which latter position it acts as a bottom for the blank mold to close the mold bottom while the mold is moving back from gathering position to blank blowing position and until the blank is blown.

The furnace 8 is provided in its side facing the mold with an outlet 12 with which communicates the inner end of a boot-like discharge receptacle 13 containing a bath of glass 14 maintained at a constant level by flow from the furnace. The inner portion of this receptacle is closed at its top by a hood or stationary cover section 15, the outer portion of the top of the receptacle being open to permit of the insertion and withdrawal of the induction end of the blank mold for a gathering operation, as shown in Figure 2.

A movable (reciprocatory) cover 16 is employed to close the opening in the receptacle to prevent loss of heat and chilling of the glass at all times except when the blank mold is gathering glass. This cover is coupled to the carriage 3 for movement therewith by a lost-motion link and pin connection 17, and said cover is preferably provided with rollers 18 to run upon track rails 19 on the receptacle in order to secure a free and easy movement thereof. As shown, the cover is formed with top and side walls and an outer end wall so as to provide with the stationary cover section 15 a complete closure for the top of the receptacle during the intervals between gathering operations. At its inner end the cover 16 is open to adapt said cover when moved to open position to telescope over the cover section 15, in which position the outer end wall of the cover 16 acts as a door to close the inner portion of the receptacle and the outlet 12 against the entrance of cooling drafts, leaving exposed only that portion of the glass from which the gather is to be directly made. A gas burner 20 carried by the cover 16 is arranged to project a heating flame down upon the surface of the glass. When the cover 16 is open this flame plays upon the glass between the furnace outlet and the gathering point, so as to prevent undue chilling of the glass during the gathering period. When the cover 16 is closed the flame plays directly upon that portion of the glass which was exposed during the gathering operation, and hence upon the "cold spot" made by contact of the blank mold with the glass and upon the teat 21 left upon the severance of the neck of glass by the cut-off 11, thus heating such cooled portions of the glass and making the temperature and consistency of the glass at the gathering point substantially uniform for the next gathering action.

The operation is as follows:

Figure 1 shows the cover 16 in closed position and the blank mold in the position it occupies for coaction with a vertically movable finishing mold. Assuming that an article has been formed by the molds, the finishing mold retracted and the blank and neck molds closed ready for a gathering action, the carriage 3 is moved by its operating mechanism toward the furnace so as to bring the blank mold into alinement with the gathering opening in the receptacle 13, during which action the cover 16 is shifted to open position, and at the completion of movement of the carriage the rollers 3ᵃ pass from the track surfaces 5 onto the track surfaces 6, thus causing the lower end of the mold to dip into the glass in the receptacle 13. The suction mechanism, of whatever type used, then operates to fill the mold cavity with a charge of glass, whereupon the carriage begins its backward movement to the position shown in Figure 1 and cover 16 is shifted back to close the gathering opening in the receptacle. As the carriage is raised at the fore part of its backward movement from the track surfaces 6 to the track surfaces 5, to lift the mold out of the bath, the cut-off knife 11 is operated to sever the string or neck of glass connecting the charge in the mold with the bath, as shown in Figure 3, and, if this knife is used as a mold closure, it remains in the position shown in Figure 3 to retain the charge in the mold until the blank is blown, after which the knife is moved to its retracted position shown in Figures 1 and 2. It is to be understood that the blank may be blown after the blank mold has been returned to the position shown in Figure 1 or may be blown during the period of backward travel of the mold. During the gathering operation the portion of the mold contacting with the glass in the receptacle chills that portion of the glass, leaving a "cold spot" or zone of glass which is thicker than the remainder of the glass, and which surrounds the teat 21 left by the action of the cut-off. On the return of the cover 16 to closed position and until the cover is again opened the flame from the burner 20 plays upon the cold spot and teat, melts down the teat and brings the glass in the receptacle back to a uniform temperature and consistency, so that the charge next taken up by the mold will be free from irregularities liable to cause the formation of an imperfect article.

During or upon the completion of the return movement of the blank mold the finishing mold (not shown) moves upward to enclose the blank supported by the neck mold when the blank mold is opened, the blank is then blown to form the finished article, and the neck and finishing molds are then opened to release the article which is transferred in any suitable manner, directly or indirectly, to a leer for annealing. The finishing mold is then retracted and the blank and neck molds closed for a repetition of the gathering and forming operations above described.

The advantages of my improved molding apparatus are as follows: One or more sets or units of gathering and molding devices in connection with a source of compressed air supply may be used in conjunction with and at different points about a furnace and operated, in the case of a plurality of sets, simultaneously or in a desired sequence, without the necessity of employing expensive power equipment or employing and moving a large supporting mass carrying the units. Greater speed of action may also be obtained in the gathering and blowing actions because of the simple gathering and return motion of the gathering mold and the use of a supporting track constituting a single means for supporting the mold and raising and lowering it in its reciprocations for the gathering actions. As the glass to be gathered is contained in a comparatively small quantity in a stationary receptacle which is closed except during gathering periods, the glass is maintained in a generally better condition for the gathering operation and for the formation of articles from the glass charges. Furthermore, by heating the glass in the receptacle in the prescribed manner cold portions left at the end of a gathering action are heated and the glass restored to a condition of uniform temperature and consistency for the next gathering action, thus ensuring the constant supply of charges of uniformly excellent quality for the production of articles free or substantially free from defects. It will be observed that my invention provides an elongated or bar-like carriage having longitudinally spaced wheels or rollers arranged to run upon a trackway for supporting the carriage for reciprocatory motion in a horizontal plane, which trackway is provided with longitudinally spaced inclined or cam portions corresponding in arrangement with the wheels or rollers for effecting the downward and upward movements of the carriage and mold for a gathering action, and that the wheels or rollers are also so arranged as to balance the carriage to prevent it from tilting on the trackway. By this means the trackway cooperates with the carriage to serve the double function of supporting the carriage and guiding it in its reciprocatory movements and also effecting the vertical movements of the carriage and mold for a gathering action, thus avoiding the necessity of using separate and independent means for supporting and guiding the carriage and raising and lowering it, as in prior constructions. My invention therefore avoids the complexities of prior apparatus and provides an apparatus which is considerably simpler in construcion and much less expensive of production, installation and maintenance.

While my invention is expressed as intended to be used in units of a single set of molds working at a fixed point or station, instead of being moved in a circular path, it is to be understood that I do not limit my invention to such use, as the essential features thereof may be used in an oscillatory or a revolving type of apparatus, if desired.

Having thus fully described my invention, I claim:—

1. In a glass molding apparatus, a receptacle for molten glass, a suction mold adapted to gather glass therefrom, a carriage supporting the mold, a trackway having relatively fixed guide portions mounting the mold to reciprocate in a horizontal plane and to move downwardly for entrance into the receptacle and upwardly for withdrawal therefrom, a cover coupled to the carriage for movement therewith to open and close the receptacle, and a burner carried by and movable with the cover and operating to heat the glass in the receptacle between mold gathering actions.

2. In a glass molding apparatus, a glass receptacle having an opening in its top, a reciprocatory cover for covering and uncovering said opening, a suction mold, a carriage supporting the same, a trackway on which the mold carriage is movable in a straight line toward and from the receptacle, said trackway having relatively fixed elevated portions for guiding the mold in a horizontal plane toward and from the receptacle, depressed portions for supporting the carriage mold in gathering position, and inclined portions for guiding the mold between said elevated and depressed portion downwardly into and upwardly out of the receptacle, and a coupling element having a pivoted lost motion connection with the mold and the cover for transmitting opening and closing movements to the cover in the forward and backward movements of the mold carriage and permitting independent vertical movement of the carriage and mold.

3. In a glass molding apparatus, a glass receptacle having a gathering opening in its top, a suction mold adapted to be moved horizontally toward and from and vertically into and out of said opening to take up a charge of glass from the receptacle, a horizontally reciprocating and vertically movable carriage supporting the mold and having longitudinally spaced roller supports, a stationary linear trackway having horizontal elevated portions on which the carriage is movable to bring the mold to a position above the opening in the receptacle, spaced depressed horizontal portions for supporting the mold in a depressed position within the receptacle, and inclined portions connecting said elevated and depressed portions for lowering the mold into and raising it out of the receptacle, said depressed portions being spaced according to said depressed track portions to rest therein when the mold is in gathering position, a horizontally reciprocatory closure movable to cover and uncover the opening in the receptacle, and a flexible lost motion connection between the carriage and the closure for shifting the closure in the horizontal movements of the carriage and permitting vertical movements of the carriage independent of the closure and a range of horizontal movement of the carriage greater than that of the closure.

4. In a glass molding apparatus, a melting furnace, an open-topped receptacle on the exterior of the furnace and receiving glass therefrom, a support, a stationary track mounted on said support and provided with spaced parallel track rails, a carriage provided with longitudinally spaced pairs of rollers to travel on said rails and mounted thereon to reciprocate horizontally toward and from said receptacle, and a suction mold mounted at one end of the carriage for movement by the reciprocations of the latter toward and from a gathering position above the opening in the receptacle, the said track rails having relatively fixed and spaced upper sections and relatively spaced lower sections fixed with respect to each other and to said upper sections and connected by inclined portions longitudinally spaced to correspond with the spacing of the carriage rollers for raising and lowering the carriage to move the mold when disposed in gathering position into and out of the receptacle through the open top thereof.

5. In a glass molding apparatus, a glass melting furnace, a receptacle disposed externally of and receiving molten glass from the furnace, said receptacle having a gathering opening in the top thereof, a suction mold adapted to enter and gather glass from the receptacle through said opening and then to be withdrawn therefrom, a horizontally reciprocatory cover movable to open and close the receptacle, means for separating the neck of glass connecting the gathered glass in the mold from the glass in the receptacle during the withdrawal of the mold, a reciprocatory carriage supporting the mold, means actuated by the mold carriage for imparting opening and closing movements to the cover, and means for directly heating the glass in the receptacle at the gathering point so as to eliminate the cold spot and residual portion of the neck left as a result of the gathering and severing actions.

6. In a glass molding apparatus, a furnace, a stationary glass receptacle on the outer side of and receiving molten glass from said furnace and having a gathering opening in its top, a stationary horizontal track having elevated portions and depressed cam portions, a wheeled carriage movable horizontally toward and from the receptacle on said elevated portions of the track and vertically into and out of said opening for a gathering action on said cam portions of the track, means for separating the neck of glass connecting the gathered glass in the mold from the glass in the receptacle, a horizontally reciprocatory cover actuated by the mold carriage in its horizontal movements for covering said opening between mold gathering actions and uncovering the same for a mold gathering action, and means for directly heating the glass in the receptacle at the gathering point between gathering periods so as to eliminate the cold spot and residual portion of the neck as a result of the gathering and severing actions.

7. In a glass molding apparatus, a glass melting furnace, a receptacle for molten glass disposed externally of the furnace and receiving glass therefrom, said receptacle having a gathering opening in the top thereof, a suction mold adapted to gather glass from said receptacle through said opening, a carriage supporting the mold, a stationary track on which the carriage is mounted to reciprocate in a horizontal plane, said track having cam portions to move the mold downwardly for entrance into the receptacle and upwardly for withdrawal therefrom, a cover horizontally reciprocable to open and close the opening in the receptacle, and a direct lost motion link connection between the carriage and the cover operative in the horizontal movements of the carriage for opening and closing the cover.

8. In a glass molding apparatus, a glass melting furnace, a receptacle for molten glass disposed externally of the furnace and receiving glass therefrom, said receptacle having a gathering opening in the top thereof, a suction mold adapted to gather glass from said receptacle through said opening, a carriage supporting the mold, a stationary track on which the carriage is mounted to reciprocate in a horizontal plane, said track having cam portions to move the mold downwardly for entrance into the receptacle and upwardly for withdrawal therefrom, a cover horizontally reciprocable to open and close the opening in the receptacle, means for directly heating the glass in the receptacle at the gathering point between mold gathering actions, and a direct lost motion link connection between the carriage and the cover operative in the horizontal movements of the carriage for opening and closing the cover.

9. In a glass molding apparatus, a glass melting furnace, a receptacle at the side thereof receiving glass therefrom and having a gathering opening in the top thereof, a support, a stationary linear trackway carried by said support and arranged in a horizontal plane above the plane of the receptacle, a longitudinally reciprocating and vertically movable carriage provided with a plurality of longitudinally spaced front and rear roller supports to run upon said trackway toward and from said receptacle, said trackway having fixedly related elongated elevated portions and longitudinally spaced relatively depressed portions connected therewith by inclined portions and corresponding in spacing to the roller supports on the carriage and operating to lower the carriage bodily when one end thereof reaches a position above the gathering opening in the receptacle, whereby the trackway constitutes a single means for supporting and guiding and raising and lowering the carriage in its reciprocations, and a suction mold carried by said end of the carriage and movable therewith, the construction and arrangement of the roller supports and the trackway and carriage being such as to prevent such end of the carriage from tilting on the front roller supports under the weight of the mold.

10. In a glass molding apparatus, a molten glass receptacle, a post, a track having a mounting intermediate its length engaged with said post, a suction mold, a carriage for said mold having reciprocating movement along said track to shift the mold toward and away from said receptacle, said carriage having rollers resting upon portions of the track at opposite sides of the post to slidably mount the carriage and limit reciprocating movement of the carriage by contact with said mounting, said track having cam portions for imparting vertical movement to the carriage and mold at the limit of their movement toward the receptacle for a gathering action.

ALBERT R. BETHEL.